United States Patent
Ouimet

(10) Patent No.: US 7,376,633 B2
(45) Date of Patent: May 20, 2008

(54) CONFIGURATIONAL DENSITY PROCESS AND STRUCTURE

(75) Inventor: Kenneth J. Ouimet, Scottsdale, AZ (US)

(73) Assignee: Khimetrics, Inc., Scottsdale, AZ (US)

( * ) Notice: Subject to any disclaimer, the term of this patent is extended or adjusted under 35 U.S.C. 154(b) by 163 days.

(21) Appl. No.: 11/121,447

(22) Filed: May 4, 2005

(65) Prior Publication Data

US 2005/0251434 A1  Nov. 10, 2005

Related U.S. Application Data

(60) Provisional application No. 60/568,380, filed on May 4, 2004.

(51) Int. Cl.
   G06N 3/08  (2006.01)
   G06N 5/00  (2006.01)

(52) U.S. Cl. .............. 706/19; 706/15; 706/62; 700/28; 716/2

(58) Field of Classification Search ........... 706/19, 706/15, 62; 700/28; 716/2
   See application file for complete search history.

(56) References Cited

U.S. PATENT DOCUMENTS

| | | | | |
|---|---|---|---|---|
| 5,253,327 A | * | 10/1993 | Yoshihara | 706/19 |
| 5,255,349 A | * | 10/1993 | Thakoor et al. | 706/34 |
| 5,272,638 A | * | 12/1993 | Martin et al. | 455/456.5 |
| 5,274,742 A | * | 12/1993 | Morita et al. | 706/19 |
| 6,052,678 A | * | 4/2000 | Itoh et al. | 706/13 |
| 6,516,307 B1 | * | 2/2003 | Masuoka et al. | 706/12 |
| 6,581,002 B2 | * | 6/2003 | Ugajin | 701/209 |
| 6,636,840 B1 | * | 10/2003 | Goray et al. | 706/12 |
| 6,904,421 B2 | * | 6/2005 | Shetty | 706/13 |
| 7,065,510 B2 | * | 6/2006 | Shackleford | 706/13 |
| 2002/0174021 A1 | * | 11/2002 | Chu et al. | 705/26 |

* cited by examiner

Primary Examiner—David Vincent
Assistant Examiner—Adrian L Kennedy
(74) Attorney, Agent, or Firm—Welsh & Katz, Ltd.

(57) ABSTRACT

A computer program product is described for solving the traveling salesman problem in polynomial time. The probability distribution of the space of all paths is modeled in a configurational density distribution. A Hamiltonian is constructed specifying the costs, distance, or penalty associated with different legs of paths encompassed in the configurational density distribution. Starting at a maximum temperature where free energy dominates and the penalty function plays little role, the system is iteratively adapted to reduce the temperature in steps incrementally chosen to preserve the linear characteristic of the approximation, until a lower temperature state of reduced energy is reached in which a preferred set of paths can be identified from the configurational density distribution.

11 Claims, 11 Drawing Sheets

FIG 10

All Paths — 1001

| p | s=1 | s=2 | s=3 | s=4 | s=5 |
|---|---|---|---|---|---|
| 1 | A | B | C | D | E |
| 2 | A | B | D | C | E |
| 3 | A | C | B | D | E |
| 4 | A | C | D | B | E |
| 5 | A | D | C | B | E |
| 6 | A | D | B | C | E |

Γ(c1,s1,c2,s2|p=1) — 1010

| p | c1 | s1 | c2 | s2 | Γ |
|---|---|---|---|---|---|
| 1 | A | 1 | A | 1 | 50% |
| 1 | A | 1 | B | 2 | 50% |
| 1 | A | 1 | C | 3 | 50% |
| 1 | A | 1 | D | 4 | 50% |
| 1 | A | 1 | E | 5 | 50% |
| 1 | B | 2 | A | 1 | 50% |
| 1 | B | 2 | B | 2 | 50% |
| 1 | B | 2 | C | 3 | 50% |
| 1 | B | 2 | D | 4 | 50% |
| 1 | B | 2 | E | 5 | 50% |
| 1 | C | 3 | A | 1 | 50% |
| 1 | C | 3 | B | 2 | 50% |
| 1 | C | 3 | C | 3 | 50% |
| 1 | C | 3 | D | 4 | 50% |
| 1 | C | 3 | E | 5 | 50% |
| 1 | D | 4 | A | 1 | 50% |
| 1 | D | 4 | B | 2 | 50% |
| 1 | D | 4 | C | 3 | 50% |
| 1 | D | 4 | D | 4 | 50% |
| 1 | D | 4 | E | 5 | 50% |
| 1 | E | 5 | A | 1 | 50% |
| 1 | E | 5 | B | 2 | 50% |
| 1 | E | 5 | C | 3 | 50% |
| 1 | E | 5 | D | 4 | 50% |
| 1 | E | 5 | E | 5 | 50% |

Γ(c1,s1,c2,s2|p=5) — 1020

| p | c1 | s1 | c2 | s2 | Γ |
|---|---|---|---|---|---|
| 5 | A | 1 | A | 1 | 50% |
| 5 | A | 1 | B | 4 | 50% |
| 5 | A | 1 | C | 3 | 50% |
| 5 | A | 1 | D | 2 | 50% |
| 5 | A | 1 | E | 5 | 50% |
| 5 | B | 4 | A | 1 | 50% |
| 5 | B | 4 | B | 4 | 50% |
| 5 | B | 4 | C | 3 | 50% |
| 5 | B | 4 | D | 2 | 50% |
| 5 | B | 4 | E | 5 | 50% |
| 5 | C | 3 | A | 1 | 50% |
| 5 | C | 3 | B | 4 | 50% |
| 5 | C | 3 | C | 3 | 50% |
| 5 | C | 3 | D | 2 | 50% |
| 5 | C | 3 | E | 5 | 50% |
| 5 | D | 2 | A | 1 | 50% |
| 5 | D | 2 | B | 4 | 50% |
| 5 | D | 2 | C | 3 | 50% |
| 5 | D | 2 | D | 2 | 50% |
| 5 | D | 2 | E | 5 | 50% |
| 5 | E | 5 | A | 1 | 50% |
| 5 | E | 5 | B | 4 | 50% |
| 5 | E | 5 | C | 3 | 50% |
| 5 | E | 5 | D | 2 | 50% |
| 5 | E | 5 | E | 5 | 50% |

Clockwise Soln — 1030

| p | c | s | g |
|---|---|---|---|
| 1 | A | 1 | 1 |
| 1 | B | 2 | 1 |
| 1 | C | 3 | 1 |
| 1 | D | 4 | 1 |
| 1 | E | 5 | 1 |

Γ(c1,s1,c2,s2) — 1040

| c1 | s1 | c2 | s2 | Γ |
|---|---|---|---|---|
| A | 1 | A | 1 | 100% |
| A | 1 | B | 4 | 50% |
| A | 1 | B | 2 | 50% |
| A | 1 | C | 3 | 100% |
| A | 1 | D | 2 | 50% |
| A | 1 | D | 4 | 50% |
| A | 1 | E | 5 | 100% |
| B | 2 | A | 1 | 50% |
| B | 2 | B | 2 | 50% |
| B | 2 | C | 3 | 50% |
| B | 2 | D | 4 | 50% |
| B | 2 | E | 5 | 50% |
| B | 4 | A | 1 | 50% |
| B | 4 | B | 4 | 50% |
| B | 4 | C | 3 | 50% |
| B | 4 | D | 2 | 50% |
| B | 4 | E | 5 | 50% |
| C | 3 | A | 1 | 100% |
| C | 3 | B | 4 | 50% |
| C | 3 | B | 2 | 50% |
| C | 3 | C | 3 | 100% |
| C | 3 | D | 2 | 50% |
| C | 3 | D | 4 | 50% |
| C | 3 | E | 5 | 100% |
| D | 2 | A | 1 | 50% |
| D | 2 | B | 4 | 50% |
| D | 2 | C | 3 | 50% |
| D | 2 | D | 2 | 50% |
| D | 2 | E | 5 | 50% |
| D | 4 | A | 1 | 50% |
| D | 4 | B | 2 | 50% |
| D | 4 | C | 3 | 50% |
| D | 4 | D | 4 | 50% |
| D | 4 | E | 5 | 50% |
| E | 5 | A | 1 | 100% |
| E | 5 | B | 4 | 50% |
| E | 5 | B | 2 | 50% |
| E | 5 | C | 3 | 100% |
| E | 5 | D | 2 | 50% |
| E | 5 | D | 4 | 50% |
| E | 5 | E | 5 | 100% |

Counter Clockwise Soln — 1050

| p | c | s | g |
|---|---|---|---|
| 5 | A | 1 | 1 |
| 5 | D | 2 | 1 |
| 5 | C | 3 | 1 |
| 5 | B | 4 | 1 |
| 5 | E | 5 | 1 |

City-Stop Density — 1070

| c1 | s1 | ρ |
|---|---|---|
| A | 1 | 100% |
| B | 2 | 50% |
| B | 4 | 50% |
| C | 3 | 100% |
| D | 2 | 50% |
| D | 4 | 50% |
| E | 5 | 100% |

City - City Connection Density — 1080

| c1 | c2 | γ |
|---|---|---|
| A | B | 50% |
| A | D | 50% |
| B | C | 50% |
| B | E | 50% |
| C | B | 50% |
| C | D | 50% |
| D | C | 50% |
| D | E | 50% |
| E | A | 100% |

CONFIGURATIONAL DENSITY PROCESS AND STRUCTURE

CLAIM OF PRIORITY

Priority is claimed herein to provisional application No. 60/568,380, filed May 4, 2004, which is incorporated herein by reference.

FIELD OF INVENTION

This invention relates generally to the field of computational optimization and, more particularly, to a polynomial-time solution for the traveling salesman problem.

NOMENCLATURE

The following symbols are used in the following sense herein.

| Term | Definition |
| --- | --- |
| A | Configurational Activity Function |
| C | Generalized constraint (h and f) |
| F | Helmholtz Free Energy |
| G | Constraint function |
| H | Hamiltonian (penalty function) |
| M | Total number of all cs-c's' links |
| N | Number of actual cities (plus one to ensure round trip) |
| O | Order of magnitude |
| P | Path index |
| Q | Constraint index |
| S | Configurational entropy |
| T | Temperature |
| c | City index |
| d | City index |
| f | Constraint function |
| g | Path function |
| h | Constraint function |
| i | General constraint index |
| j | Mapping index |
| k | General parameters index |
| m | Number of links specifically joining cs-c's' |
| p | Total number of paths |
| q | Constraint derivative |
| s | Stop index |
| t | Stop index |
| u | Potential to enforce constraint f |
| v | Potential to enforce constraint h |
| x | City position vector |
| $\Gamma$ | Configurational density function |
| $\phi$ | Constraint gradient function |
| $\Omega$ | Number of configurations |
| $\gamma$ | Propagator from cs to c' as s + 1 |
| $\delta$ | Delta function |
| $\epsilon$ | Tolerance |
| $\eta$ | Constraint derivative |
| $\lambda$ | Parameter vector |
| $\rho$ | City-Stop density |
| $\tau$ | Number of temperature steps in annealing process |
| $\chi$ | City-City connection density |

BACKGROUND

The "traveling salesman" problem is a well-known in optimization theory. The problem may be expressed as determining the shortest path that will allow a salesman to visit all the cities on a map and return to his starting position. While many straightforward, brute-force solutions to this problem are known, all suffer from the defect that the computational complexity increases exponentially as a function of the number of cities.

The traveling salesman problem is among the most thoroughly investigated problems in the field of optimization theory. It serves as a benchmark test where optimization algorithms compete for world records. Many algorithms have been developed to solve this problem, but no general solution has yet been proposed which can find the best path that scales polynomially with the number of cities. Many suppose that there is no general solution which can find the best path that scales polynomially with the number of cities.

Additional information on the history and background of the traveling salesman problem can be found in published materials including G. Gutin & ed. A. P. Punnen, ed., The Traveling Salesman Problem and Its Variations (Kluwer Academic Publishers, 2002) and E. L. Lawler, J. K. Lenstra, A. H. G. Rinnooy Kan, & D. B. Shmoys, eds., The Traveling Salesman Problem: A Guided Tour of Combinatorial Optimization (John Wiley & Sons, 1985).

Applying techniques of statistical physics, applicant has invented a process which provides a general solution to the traveling salesman problem, wherein said process scales polynomially with the number of cities. In addition, the solution finds all solutions not just one. The approach is a statistical physics approach which determines the distribution of all solutions. Previous attempts of applying statistical physics have failed at determining a general solution because they could not rule out all un-allowed paths. In one embodiment, the present invention relies in part on a description of the solution distribution capable of excluding all unallowed paths.

OBJECTS AND ADVANTAGES OF EMBODIMENTS OF THE INVENTION

Embodiments within the scope of the invention and the subject matter claimed herein may exhibit one or more of the following advantages and objects.

An embodiment may describe the distribution of all solutions. This aspect of one embodiment can be very useful in determining critical paths considering all solutions. For example, if the TSP problem represents the paths a competitor is likely to take, knowing the statistics of all solutions can help zero in on where to attack.

An embodiment may be deterministic and scale in polynomial time with the number of nodes. Worst case situations of one embodiment scales O(N9) with the number of nodes, N. Other embodiments also within the scope of this invention are anticipated to scale O(N4) or better with the number of nodes, N.

An embodiment may provide the shortest path length in polynomial time.

In one embodiment the solution that results from application of the process can be used to explore the solution distribution for close to optimal solutions (T>0).

SUMMARY OF THE DRAWINGS

FIG. 10 shows some tables of values uses prepared in accordance with an embodiment of the present invention.

DETAILED DESCRIPTION

Figure 1:
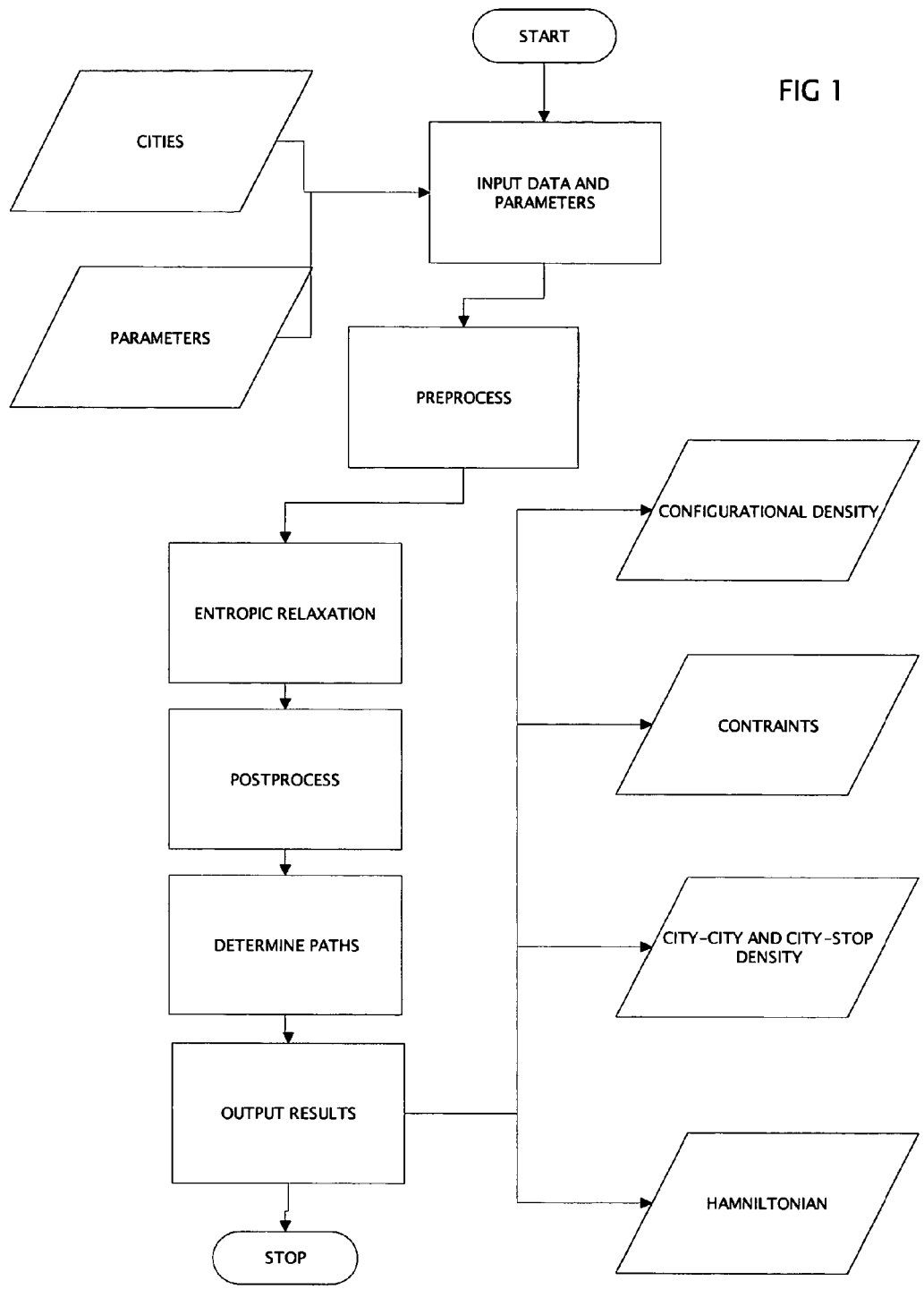
FIG. 1 illustrates the flow of control and process flow of a configurational density process as applied to the traveling salesman problem

While the present invention is susceptible of embodiment in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Traveling Salesman Problem Embodiment of Configurational Density Process

FIG. 1 illustrates the flow of control and process flow of a configurational density process as applied to the traveling salesman problem. Control passes to an input process (110), which loads information including the coordinates of each city (112) and parameters (114) for the overall process. Control passes to a Preprocessor process (120), which calculates the configurational activity and Hamiltonian and initializes the system at infinite temperature T. Control passes to an Entropic Relaxation process (130) which gradually cools the temperature T of the system. Control passes to post-processing process (140), which calculates a city-city density p and city-stop density $\chi$. Control passes to a determine paths process (150), which computes the optimal or near optimal paths based on the configurational density at low entropy. Control passes to an output results process (160), which outputs information. Information output may include preferred paths and configurational density data and activity data (162), potentials data (164), city-city density and city stop density data (166), and Hamiltonian data (168).

An embodiment of the input process (110) is described more specifically below in connection with FIG. 6, which illustrates the flow of control and data in one embodiment of the input process (110).

An embodiment of the Preprocessor process (120) is described more specifically below in connection with FIG. 2, which illustrates flow of control and process flow in an embodiment of the pre-process process (120).

Figure 3:
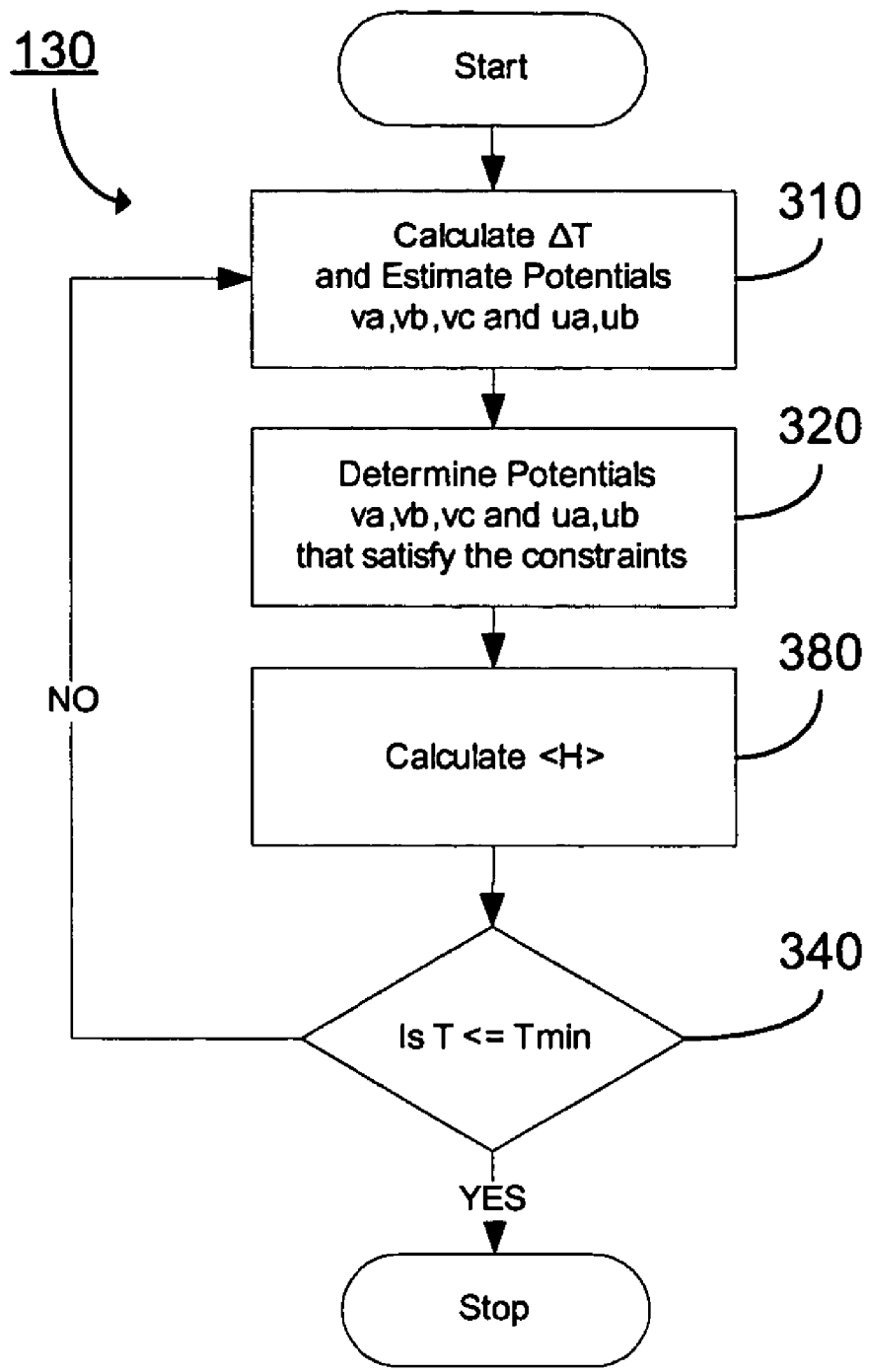
FIG. 3 illustrates the flow of control and process flow in an embodiment of an entropic relaxation process.

In an embodiment of the Entropic Relaxation process (130), as the temperature is cooled the distance penalty plays a stronger and stronger role. As T→0, entropy plays less and less of a role in the free energy and the configurational density describes the ground state, encompassing all solutions. FIG. 3 illustrates the Entropic Relaxation process (130) in more detail.

An embodiment of the post-processing process (140) calculates a city-city density p and city-stop density $\chi$ and summarizes the configurational density. This summarization includes two components. A first component of the configurational density summarization is the city-stop density p. A second component of the configurational density summarization is the city-city density $\chi$. The city-stop density p denotes the probability (considering all solutions) that city c is on stop s. It is a summation over all allowed paths, $\rho(c,s)=(\Sigma c',s'A(c,s,c',s')\lceil(c,s,c',s'))/N$. The city-city density $\chi$ describes the probability (considering all solutions) that city c proceeds city c', which is determined according to $\chi(c,c')=(\Sigma sA(c,s,c',s+1)\lceil(c,s,c',s+1))$.

An embodiment of the determine paths process (150), which computes the optimal or near optimal paths based on the configurational density at low entropy. In general the Configurational Density represents multiple paths. At high temperatures all paths are active and all (N −2)! paths are represented. At the ground state (T→0) all paths longer than the shortest path are eliminated. Unless, the configuration of cities has a high degree of symmetry, the ground state will contain only a few paths. Starting with the first stop sequentially moving forward, the paths are extracted by calculating the n-Stop Configurational Density $\lceil(n)$. The 2-Stop Configurational Density $\lceil(2)(c1,c2)=\lceil(c1,1,c2,2)$. The 3-Stop Configurational Density $\lceil(3)(c1,c2,c3)=\lceil(c1,1,c2,2) \lceil(c2,2,c3,3)=\lceil(2)(c1,c2) \lceil(c2,2,c3,3)$. The 4-Stop Configurational Density $\lceil(4)(c1,c2,c3,c4)=\lceil(c1,1,c2,2) \lceil(c2,2,c3,3) \lceil(c3,3,c4,4)=\lceil(3)(c1,c2,c3) \lceil(c3,3,c4,4)$. In general, the n-Stop Configurational Density $\lceil(n)(c1,c2, \ldots ,cn)=\lceil(n-1)(c1,c2,\ldots,cn-1) \lceil(cn-1,n-1,cn,n)$. The n Stop Configurational Density $\lceil(n)(c1,c2,\ldots,cn)$ is the probability of having city c1 on stop 1, c2 on stop 2, ..., cn on stop n. Only non-zero paths need to be kept. The set of non-zero N Stop Configurational Density describes all of the ground state paths and gp(c, s) can be constructed directly from $\lceil(N)$. In another alternative embodiment, it may be desired to determine not only the best path but the top 10 or 20 paths. This can be accomplished by cooling the system to some finite non-zero temperature extracting the paths and sorting by the value of $\lceil(N)$, where the best paths have the highest probability. The n-stop configurational density $\lceil(n)$ can be specified as a function having n variables or as a matrix of dimension n.

An embodiment of the output results process (160) writes out the results to a file, a printer, for transmission to a remote location, or to some other suitable output object. The results output can include the set of paths, the Hamiltonian for each path, the constraint values, the parameter values, the configurational density, the city-stop density $\rho$, and city-city density $\chi$, and the ensemble averaged Hamiltonian as a function of Temperature.

Figure 2:
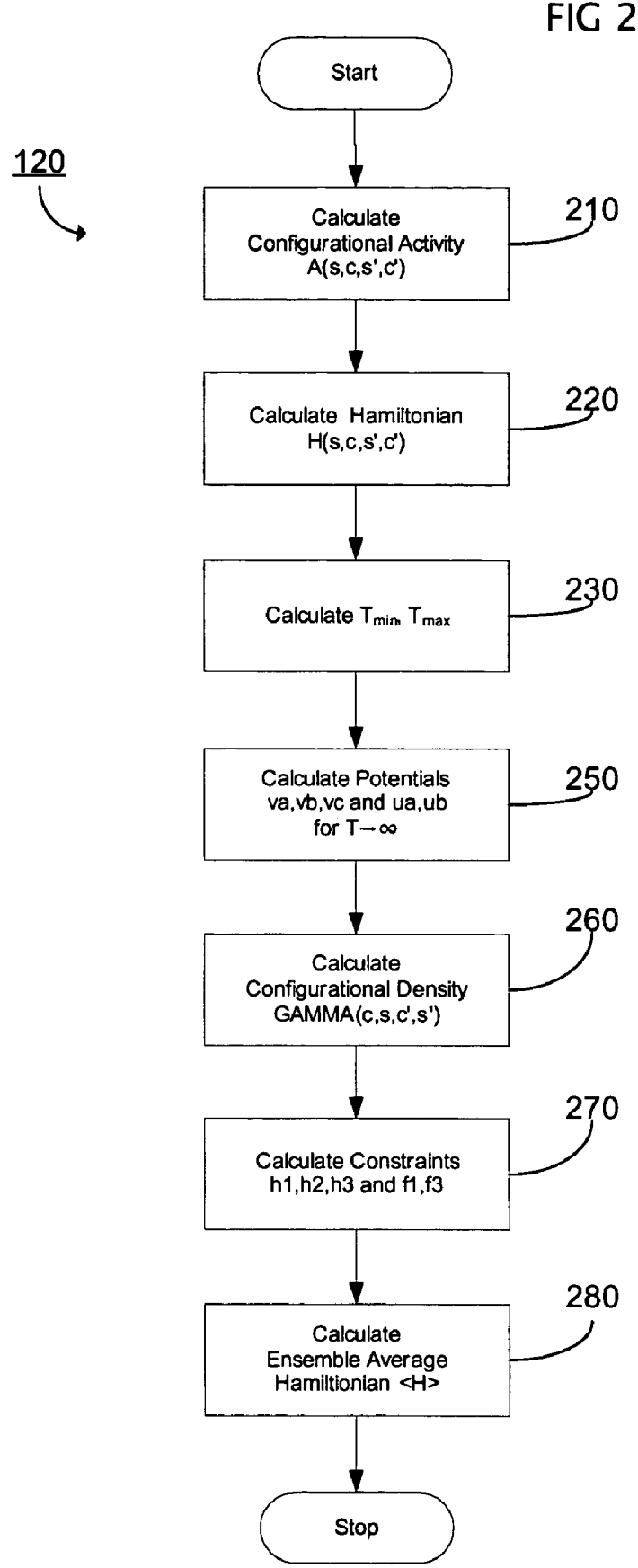
FIG. 2 illustrates flow of control and process flow in the pre-process process.

FIG. 2 illustrates flow of control and process flow in the pre-process process (120), in which configurational activity $\lceil$ and Hamiltonian H are calculated and the system is initialized in an infinite temperature state. The pre-process routine prepares the system at an infinite temperature where the configurational density and the parameters associated with the constraints can be easily determined. FIG. 2 depicts a more detailed illustration of the process depicted with less detail as the pre-processor process (120) in FIG. 1. A calling process can pass control to the pre-process process (120). Control passes in FIG. 2 to a prepare configurational activity process (210), which is used to turn off all unhallowed links.

Control passes to a determine Hamiltonian process (220), which fixes a cost or penalty associated with having a first city at a first stop number and a second city at a second stop number. Control passes to a determine Tmin and Tmax process (230), which fixes the minimum and maximum virtual temperatures for an entropic relaxation procedure. Control passes to a determine potentials process (250), which initializes parameters of the system as T→∞. Control passes to a determine configurational density process (260), which calculates configurational density ⌈(c1,s1,c2,s2) associated with a first city c1 and first stop s1 and second city c2 and second stop s2. Control passes to a determine constraints process (270), which defines constraints so that when they are satisfied the constraint functions are equal to zero. Control passes to a determine ensemble averaged Hamiltonian process (280), which computes the average tour distance for a traveling salesman problem. Control cay return to the calling process.

One embodiment of the configurational activity process (210) is depicted in more detail in FIG. 7, and described in more detail below.

The calculate Hamiltonian process (220) prepares a Hamiltonian structure A, which may be defined either in the form of a function or using a matrix structure, having as its indices or parameters a first city, a first stop number, a second city, and a second stop number. The Hamiltonian describes the cost for having a the said first city at the said first stop number and the said second city at the said second stop number. Unless the cities are consecutive stops, that is, unless the difference between the first stop number and the second stop number is one, the penalty function connection is unallowed and the penalty is undefined and may be stored in a matrix as zero. Where the stops are consecutive, the penalty function may, for example, specify the distance between the two cities in Euclidean space. It will be observed that this Hamiltonian structure has the advantage of being readily adaptable to other penalty functions. For example, if the cities represent points on a globe, the penalty function may be readily adapted to compute the distance in a spherical geometry.

An embodiment of the present invention includes as one component a Hamiltonian H reflecting a penalty or cost, such as distance. (This Hamiltonian function need not correspond in any particular way to the concept of a Hamiltonian cycle as that term is sometimes used in literature relating to the traveling salesman problem.) The Hamiltonian may be represented as a four-dimensional matrix in one embodiment or, alternatively, as a function having four arguments in another embodiment. The four values are in the domain are a first city and stop c1 and s1 and a second city and stop c2 and s2. The Hamiltonian returns the cost or penalty associated with having the first city c1 at the first stop s1 and the second city c2 at the second stop s2. For example, for a basic traveling salesman problem the cost or penalty is the measure of the distance between the two cities. In a basic traveling salesman problem the only penalty or cost arises in the distance between consecutive stops. In traveling from city A to B to C, there is no cost associated with having city C as the third stop and city A as the first stop other than the distance traveled from A to B and from B to C. However, it will be noted that the Hamiltonian structure can accommodate more complex penalty functions, including non-markov processes where the state is dependant on more than the immediate prior state. The equation below gives one example of a penalty or cost function in a Hamiltonian, being the distance between city c1 located at coordinate x1 and city c2 located at coordinate x2. The penalty might instead be associated with coordinates in three dimensional space, path along a surface to give mileage, gasoline usage between points, distance over the surface of a sphere, or any other distance, cost, or penalty function. In flat, Euclidean space the penalty function is the distance between adjacent The Hamiltonian H(c1, s1, c2, s2) describes the cost for having city c1 at stop s1 and city C2 at stop s2, i.e., $H(c1,s1,c2,s2)=(x1-x2)1/2$, where x1 is a vector indicating the position of city c1 and x2 is a vector indicating the position of city c2. If there is no additional penalty associate with non consecutive stops then the Hamiltonian is zero if the first and second stops are not adjacent, i.e., $H(c1,s1,c2,s2)=0$ if $|s1-s1|\neq 1$.

The calculate Hamiltonian process (220) may also, in one embodiment, include a find Hmax process that identifies the maximum value of H for all cities and stops. The calculate Hamiltonian process (220) may also, in one embodiment, include a find Hmin process that identifies the minimum value of H for all cities and stops.

In one embodiment, the determine Tmin and Tmax process (230), calculates the minimum and maximum temperatures for the entropic relaxation procedure. The temperature can be thought of as inversely related to the resolution at which paths are selected. The maximum temperature Tmax is related to the maximum value Hmax of the Hamiltonian H for all cities and stops. The maximum temperature Tmax is determined so that at T=Tmax the Hamiltonian makes a small correction to the T→∞ state. The ratio of Hmax to Tmax is set less than or equal to $\epsilon$, where $\epsilon \leq 0.1$ is a small number that ensures that the configurational density can be linearized about the previous state. The minimum temperature Tmin is related to the numerical precision of the computer. In one embodiment, the temperature T=Tmax is set equal to a constant $\epsilon \leq 0.1$ multiplied times Hmax.

In one embodiment the determine potentials process (250) initializes the system at T→∞. The parameters that satisfy the constraints at T→∞ are determined by first setting all parameters va, vb, vc, ua and ub to zero. Then, in order to satisfy the constraints the parameters vc are set to values corresponding to the limit as T→∞. At this temperature entropy dominates the free energy functional, the distance penalty plays no role and all paths are equally probable. The parameter vc provides a mapping from the ordered pair (s,s') to a real number. In one embodiment, the values of Vc as T→∞ are computed based on a value of T=Tmax is set equal to a constant $\epsilon \leq 0.1$ multiplied times Hmax. As T→∞, this real number can have one of two values. A first value, v1, is equal to the product of T times the natural logarithm of N-2. A second value, v2, is equal to the product of the T times the natural logarithm of the product of N-2 times N-3. The value of vc(s, s') is set equal v1 for all s=1 or N and 1<s'<N; for all s'=1 or N and 1<s<N; and for all diagonal elements s=s', 1<s<N. The value of vc(s, s') is set equal v2 for all other values of s and s', i.e., 1<s<N, 1<s'<N, s≠s'.

An embodiment of the determine configurational density process (260) is depicted in more detail in FIG. 8, and described in more detail below.

An embodiment of the determine constraints process (270) defines the constraints so that when they are satisfied, the constraint functions ha, hb, hc, fa and fb are all equal to zero. The constraint function or matrix ha(c, c') is computed as one less than the sum over all stops s and s' of the product of the configurational density r (c,s,c',s') and the configurational activity A(c,s,c',s'). The constraint function or matrix hb(c, s') is computed as one less than the sum over all stops s and c' of the product of the configurational density ⌈(c,s, c',s') and the configurational activity A(c,s,c',s'). The constraint function or matrix hc(s, s') is computed as one less than the sum over all stops c and c' of the product of the configurational density $\Gamma$(c,s,c',s') and the configurational activity A(c,s,c',s'). In one embodiment, it may be desirable or necessary to pass control to a process to calculate city-stop density $\rho$ (which process is described in more detail in connection with the post-processing process (140)), either before or as part of the determine constraints process (270). The constraint function or matrix fa(c,s,c') can be computed as the negative of the city-stop density p(c,s) plus the sum over all stops s' of the product of the configurational density $\Gamma$(c,s,c',s') multiplied times configurational activity A(c,s,c', s'). The constraint function or matrix fb(c,s,s') can be computed as the negative of the city-stop density $\rho$(c,s) plus the sum over all stops c' of the product of the configurational density $\Gamma$(c,s,c',s') multiplied times configurational activity A(c,s,c',s').

An embodiment of the determine ensemble averaged Hamiltonian process (280) calculates an ensemble average Hamiltonian <H>. The ensemble average Hamiltonian <H> is the average tour distance, where the average is taken over all paths. In one embodiment the ensemble average Hamiltonian <H> can be calculated by averaging H(c, s, c', s') over the configurational density distribution $\Gamma$(c, s, c', s'). In one embodiment, the ensemble average Hamiltonian <H> is computed by taking the sum over all values of c, s, c', and s' of the product of the configurational activity function or matrix A, the configurational density function or matrix r, and the Hamiltonian H. As $T\to\infty$, the average Hamiltonian represents an unweighted average over all paths. As the system is cooled the average Hamiltonian will decrease as longer tours receive a stronger penalty and are gradually eliminated from the configurational density function.

FIG. 3 provides a more detailed illustration of the entropic relaxation process (130) in FIG. 1. The entropic relaxation process (130) gradually cools the system, relaxing the entropy component of the free energy and allowing the system to settle into its ground state. Control passes to a determine $\Delta T$ and estimate potentials process (310), which calculates a change in temperature $\Delta T$ and estimates potentials required to satisfy the constraints at the next temperature. Control passes to a determine potentials process (320), which provides an estimate of the change in potential vector required to satisfy the constraints. Control passes to a calculate ensemble averaged Hamiltonian process (380), which calculates and in some embodiments can store the ensemble average Hamiltonian for each temperature. Depending on whether the new temperature (after being adjusted by $\Delta T$) is greater than Tmin, control may then pass back to the determine $\Delta T$ and estimate potentials process (310) or the entropic relaxation process (300) may return control to a calling program. The sub-processes described in this entropic relaxation process (130) may be performed by passing control to the same elements used for the corresponding sub-processes of the pre-process process (120).

In an embodiment of the determine $\Delta T$ and estimate potentials process (310), The change in temperature $\Delta T$ is calculated to be the largest possible without stepping outside of the range where a linearization of the configurational density is valid. The change in potentials $\Delta \lambda$ required to satisfy the constraints G at the new temperature can be estimated using the constraint gradient calculated for the old temperature T0. The derivative of Gi with respect to T is equal to the partial derivative of Gi with T over T0 plus the partial derivative of Gi with respect to $\lambda$k over T0 times the partial derivative of $\lambda$k with respect to T, where the Gi must be equal to zero at any temperature, therefore the change in Gi with temperature must also be zero.

An embodiment of the determine potentials process (320) determines potentials that satisfy the constraints and minimize the free energy. All constraints are now represented with a constraint vector G and all potentials with a potential vector $\lambda$. Linearizing the constraints in the potentials shows that the inner product of the Hessian matrix $\nabla$G0 with $\Delta\lambda$ plus G0 is equal to G, where G0 refers to the current values of the potentials, i.e, $\nabla G0 \cdot \Delta\lambda + G0 = G$ A rearrangement of this result produces a process for determining a value to store as an estimate of $\Delta\lambda$, specifically, $\Delta\lambda = -(\nabla G0)-1G0$.

An embodiment of the calculate ensemble averaged Hamiltonian process (380) can calculates and may store the value of the Hamiltonian for each temperature T. An embodiment of this process can operate similarly to the determine ensemble averaged Hamiltonian process (280) described above.

Figure 4:
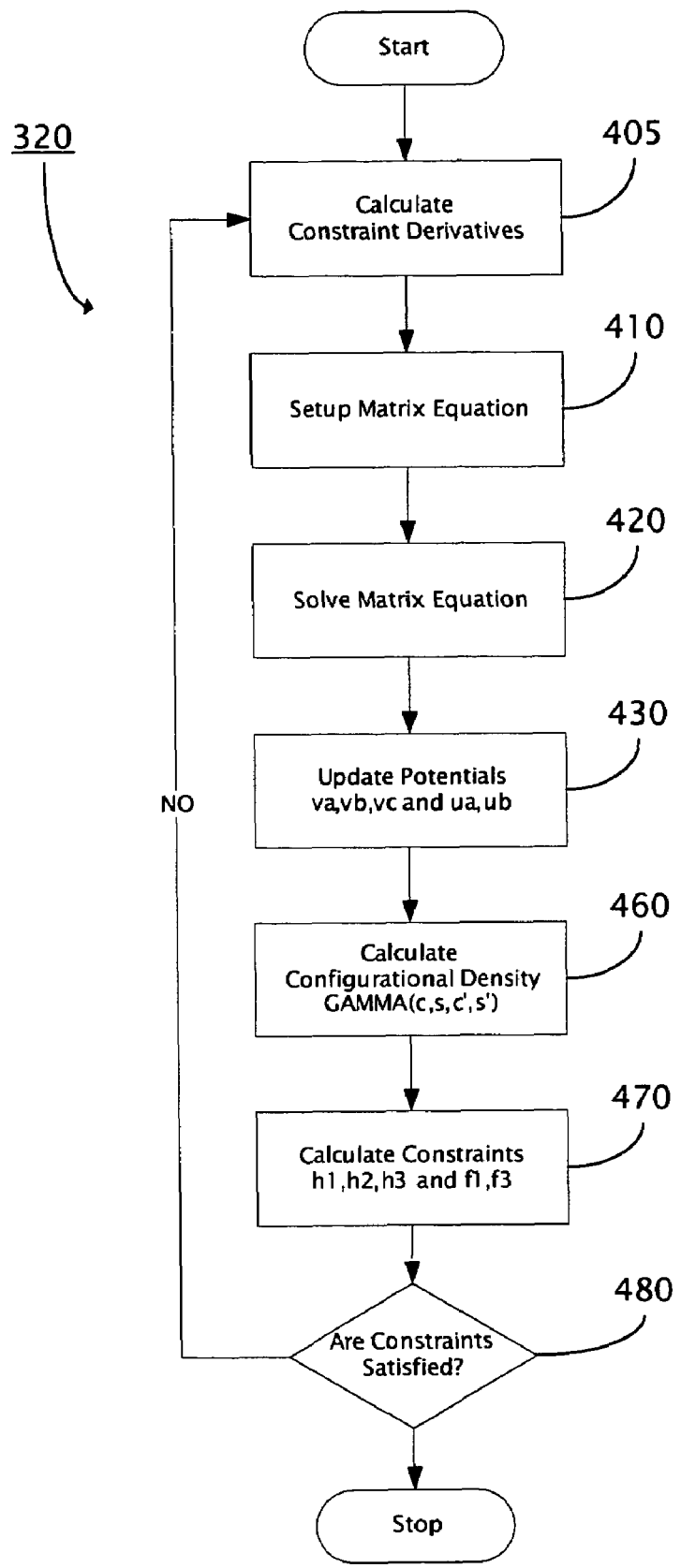
FIG. 4 illustrates the flow of control and process flow the process flow in an embodiment of a determine potentials process.

FIG. 4 provides a more detailed illustration of the process flow for determining potentials, depicted less specifically as the determine potentials process (320) in FIG. 3. The potentials that satisfy the constraints are determined by solving the linearized version of the constraints for the potentials. This requires that the derivatives of the gradients be calculated and re-indexed so that they can be put into a matrix equation. In addition in-active constraints are identified and removed and degenerate constraints are re-indexed. Control passes first in this embodiment to a calculate constraint derivatives process (405), which calculates derivatives needed. Control passes to a setup matrix equation process (410). Control passes to a solve matrix equations process (420). Control passes to an update potentials process (430), in which the potentials are calculated and stored for the new temperature, $\lambda(T) = \lambda(To) + \Delta\lambda$. Control passes to a calculate configurational density process (460), in which the configurational density is re-calculated for the new temperature and potentials. Control passes to a calculate constraints process (470) in which the constraints are recalculated. A branching operation (480) passes control selectively depending on whether constraints are satisfied. Control passes to the calculate constraint derivatives process (405) is constraints are not satisfied, and control passes back to a calling procedure if constraints are satisfied. Constraints can be considered satisfied if the absolute value of Gi is less than a tolerance specified in the configurational data.

An embodiment of the calculate constraint derivatives process (405) is illustrated with formulas and sample code on pages 6-10 and 102-11 of provisional application provisional application No. 60/568,380, filed May 4, 2004, which is incorporated herein by reference.

An embodiment of the setup matrix equation process (410) involves first mapping all of the constraints into a single constraint vector G, all of the potentials into a single potential vector $\lambda$ and the derivatives of the constraints into a Hessian matrix VG. The flow of control in an embodiment of this process is described in more detail in FIG. 5.

An embodiment of the solve matrix equations process (420) solves the matrix using a suitable method such as, for example, Gaussian Elimination, LU Decomposition, Singular Value Decomposition. Since the entropic relaxation procedure results small changes to the matrix in some cases it may be desirable to use an iterative method in the solve matrix equations process (420). An iterative method can be implemented by storing values in the components $\Delta\lambda$ according to the computation $\Delta\lambda = -(\nabla G0)-1G0$.

Figure 5:
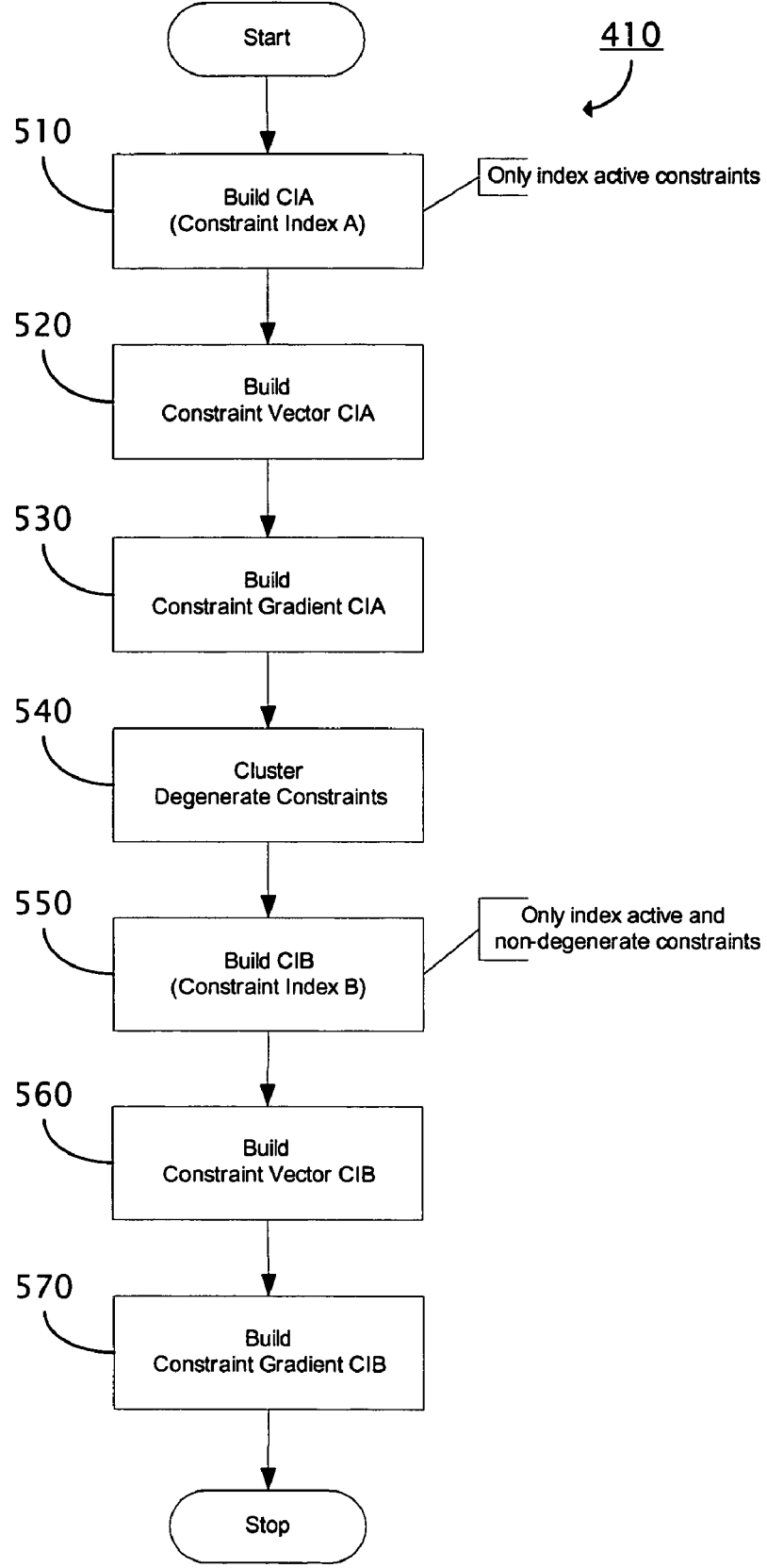
FIG. 5 illustrates the flow of control and process flow in an embodiment of a setup matrix equation process.

FIG. 5 illustrates in more detail the process flow and flow of control in the setup matrix equation process (410), which may be called by a calling process. Control passes to a build constrain index A process (510), which concerns only index active constraints. Control passes to a build constraint vector CIA (520). Control passes to a build constraint gradient CIA process (530). Control passes to a cluster degenerate constraints process (540), which eliminates inactive and degenerate constraints. Control passes to a build constraint index B process (550). Control passes to build constraint vector CIB process (560). Control passes to a constraint gradient CIB process (570). After completion of the setup matrix equation process (410), control can passes back to a calling process.

An embodiment of the build constrain index A process (510) builds or calculates the constraint index A matrix or function, referred to below as CIA. In order to solve the constraints they can be linearized and mapped from a four dimensional state space to a one dimensional parameter space. The CIA matrix can built from and can be used to map all of the constraints into a single constraint vector G, all of the potentials into a single potential vector λ and the derivatives of the constraints into a Hessian matrix ∇G. The constraint vector G and parameter vectors λ can be mapped to CIA Any suitable mapping can be used and is considered equivalent. The following mapping is suggested as one illustrative example. It should be noted that the particular mapping will also determine the respective component derivatives of the constraint vector G. In the mapping, the constraints can be partitioned according as follows: N0=0; N1=1, i.e., N0+1; N2=$N^2$; N3=$N^2$+1, i.e., $N_2$+1; N4=$2N^2$; N5=$2N^2$+1, i.e., N4+1; N6=$3N^2$ N7=$3N^2$+1, i.e., N6+1; N8=$N^3$+$3N^2$; N9=$N^3$+$3N^2$+1, i.e., $N_8$+1; N10=$2N^{3+3}N^2$.

The constraint vector G(i) can receive values of ha(c,c') for values of i from N1 to N2, i.e., for 0<i≦N2. The constraint vector G(i) can receive values of hb(c,s') for values of i from N3 to N4, i.e., N2<i>2N2. The constraint vector G(i), can receive values of hc(s,s') for values of i from N5 to N6, i.e., 2N2<i≦3N2. The constraint vector G(i) can receive values of fa(c,s,c') for values of i from N7 to N8, i.e., 3N2<i>$N^3$+3$N^2$. The constraint vector G(i) can receive values of fb(c,s,s') for values of i from N7 to N8, i.e., $N^3$+3$N^2$<i≦2$N^3$+3$N^2$.

The mapping of the parameter vector λ can be done similarly. The parameter vector λ(k) can receive values of va(c,c') for values of k from N1 to N2, i.e., for 0<k≦N2. The parameter vector λ(k) can receive values of vb(c,s') for values of k from N3 to N4, i.e., N2<k≦2N2. The parameter vector λ(k), can receive values of vc(s,s') for values of k from N5 to N6, i.e., 2N2<k≦3N2. The parameter vector λ(k) can receive values of ua(c,s,c') for values of k from N7 to N8, i.e., 3N2<k≦$N^3$+3$N^2$. The constraint vector λ(k) can receive values of ub(c,s,s') for values of k from N7 to N8, i.e., $N^3$+3$N^2$<k≦2$N^3$+3$N^2$.

An embodiment of the build constraint gradient CIA process (530) maps the derivatives of the constraints to the matrix or function CIA. It can be seen that the partial derivative of G(i) with respect to λ(k) (∂G(i)/λ(k)) can be determined by taking the partial derivative of the appropriate constraint function with respect to the appropriate parameter function as indicated by the mapping of the respective values of i and k.

An embodiment of the cluster degenerate constraints process (540) eliminates inactive constraints. The configurational activity A completely turns off some constraints. For example, the configurational activity does not allow city 1 to be on any other stop than stop 1 For example, it guarantees that the constraint fa(1,s*$1$,c')=0. Such constraints and their corresponding potentials are designated as inactive because do not play a role and can be eliminated. The inactive constraints are easily identified. They occur when all the configurational activity coefficients associated with a constraint are zero. Consulting the configurational activity matrix or function A eliminates 8N2-12N constraints. While the problem dictates specific configurations are not allowed, the configurational activity A can also be used in an alternative embodiment to eliminate configurations in which the user is not interested. The configurational activity A can also be used to accelerate the algorithm allowing it to integrate with other methods that can rule out certain configurations.

An embodiment of the cluster degenerate constraints process (540) eliminates degenerate constraints. Degenerate constraints occur when two constraints are equivalent. Again, the presence of degenerate constraints is reflected in configurational activity matrix or function A. As one example, for the specific embodiment of configurational activity A described herein the degenerate constraints include ha(1,1)=hb(1,1)=hc(1,1); ha(N,N)=hb(N,N)=hc(N,N); ha(c,1)=hb(c,1) and ha(c,N)=hb(c,N) for 1≦c≦N; hb(1,s)=hc(1,s) and hb(N,s)=hc(N,s) for 1≦s≦N; and others. Any set of degenerate constraints can be represented as a single constraint. The constraint can be any of the set of degenerate constraints. All associated potentials are also equivalent, so when replacing the degenerate constraint the potentials become dependent, which requires that the derivative of the chosen constraint is modified. For example, for the degenerate set of constraints ha(1, 1)=hb(1, 1)=hc(1, 1) we can choose constraint ha(1, 1) to be the unique constraint which will guarantee the others are satisfied and the potentials are set to vb(1, 1)=va(1, 1) and vc(1, 1)=va(1, 1). Any derivatives with respect to va(1, 1) must then be modified as follows to include components for the partials with respect to vb(1,1) and vc(1,1), taking in to account that the ∂vb(1, 1)/∂va(1,1)=∂vc(1,1)/∂va(1,1)=1.

An embodiment of a build constraint index B process (550) remaps the constraints vector, parameter vector and the Hessian of the constraint vector to Constraint Index B (CIB), which eliminates inactive and degenerate constraints. This re-mapping prevents the matrix from being ill-conditioned.

Figure 6:
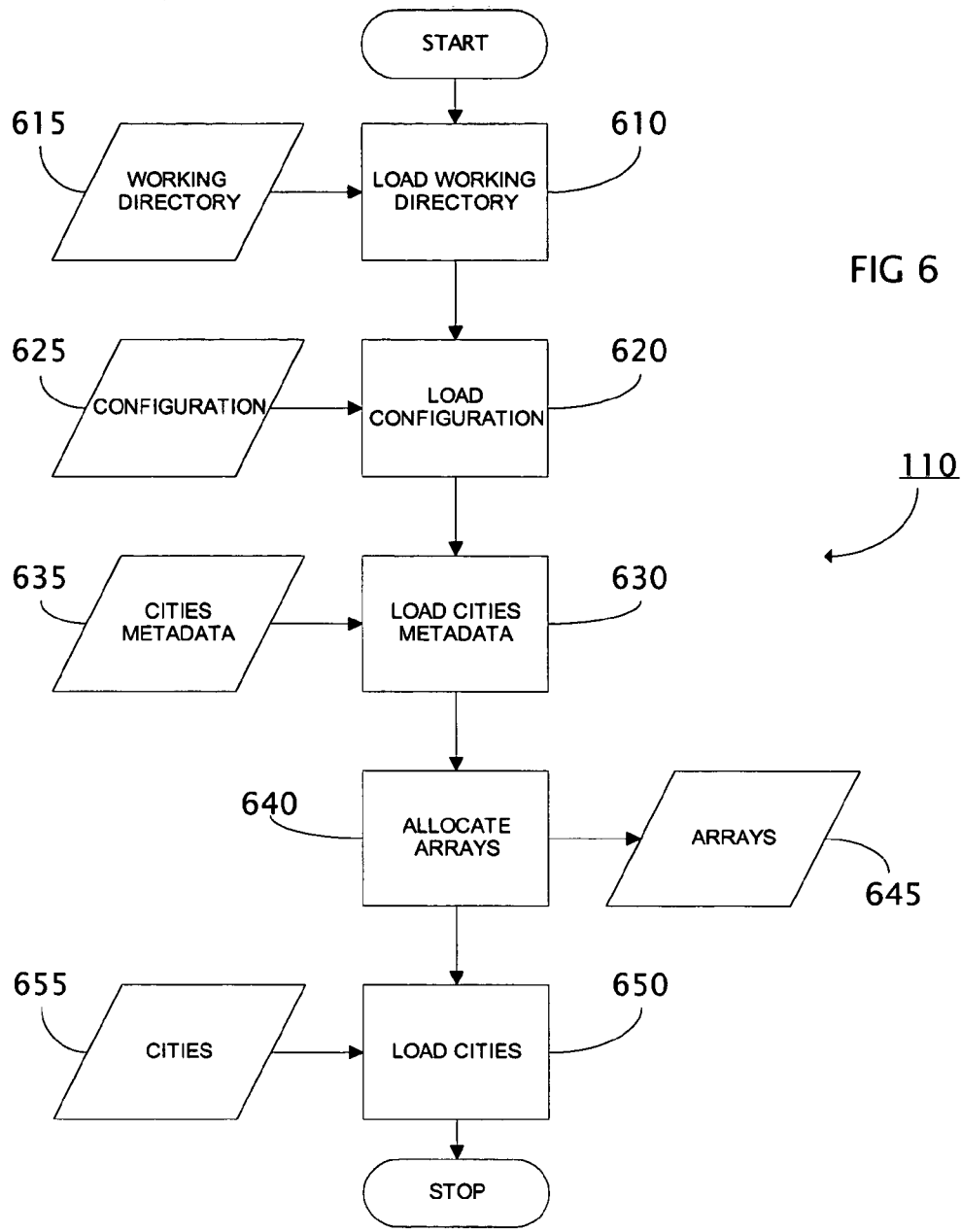
FIG. 6 illustrates the flow of control and data and process flow in an embodiment of an input process.

FIG. 6 illustrates the flow of control and data in one embodiment of the input process (110). Control passes to a load working directory process (610), which reads working directory data (615). In one embodiment, the working directory data (615) indicating the location of other configurational information may be provided as input either from a keyboard, a data file, or other input source, allowing different problem sets to be stored in different working directories. Control passes to a load configuration process (620), which can read configuration data (625). Configuration data (625) can include information such as tolerance constraints, a maximum number of iterations, and a maximum iteration temperature step. Control passes to a load cities meta-data process (630), which can read cities meta-data data (635). Cities meta-data data (635) can specify the number of cities in the problem or, in an alternative embodiment, the load cities meta-data process (630) can determine the number of cities from an examination of the cities data (655). Control passes to an allocate arrays process (640), which can allocate space for arrays data (645). Arrays data (645) can include, in various embodiments: a city identification matrix; a city location matrix; a Hamiltonian matrix; a configurational activity matrix; potentials (va, vb, vc, ua, and ub); a configurational density matrix Γ; a city-city density matrix ρ; a city-stop density matrix χ; other density matrices (ua_avg, ub_avg, Heff, ha, hb, hc, fa, fb); constraint gradient matrices, if constraint gradients are stored in matrices instead of being calculated as functions; matrix equation matrices for gradients of the constraint function, the parameter vector, and the eignevalues and eigenvectors; and constraint index A matrix CIA and constraint index B matrix CIB. Control passes to a load cities process (650), which loads cities data (655). Cities data (655) can be read from a file, a keyboard device, or other input source, and may indicate the index number and position of each city.

Figure 7:
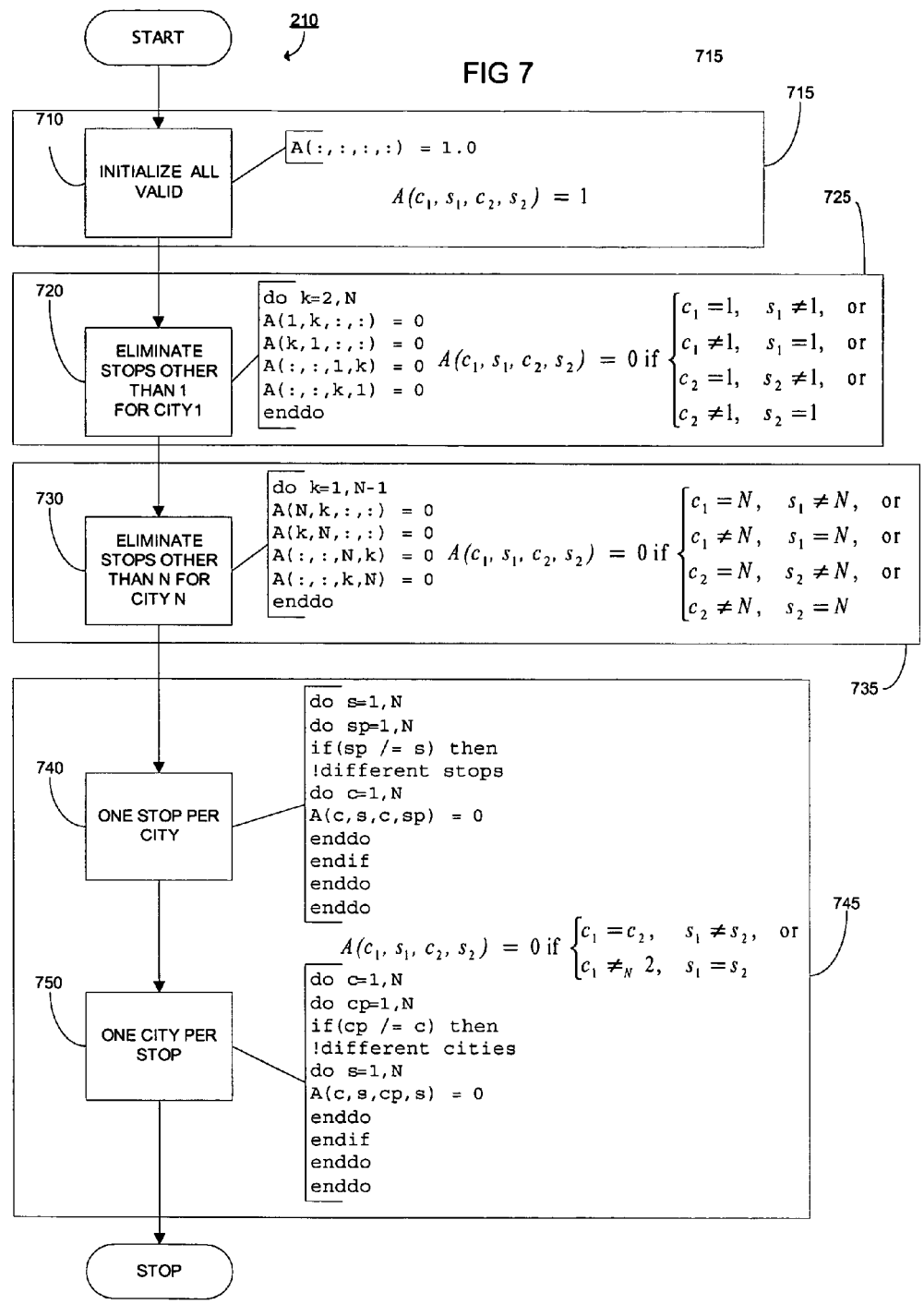
FIG. 7 illustrates the flow of control and process flow in an embodiment of a prepare configurational activity process.

FIG. 7 illustrates flow of control and sample in an example of a prepare configurational activity process (210). Control passes to an initialize all valid process (710), which initially sets all joints as valid. An initialize all valid commentary block (715) depicts sample Fortran 90 code and a functional definition. Control passes to an eliminate stops other than 1 for city 1 process (720). An eliminate stops other than 1 for city 1 process commentary block (725) depicts sample Fortran 90 code and a functional definition. Control passes to an eliminate stops other than N for city N process (730). An eliminate stops other than N for city N process commentary block (735) depicts sample Fortran 90 code and a functional definition. Control passes to a one stop per city process (740) and control passes to a one city per stop process (750). A one city per stop and one stop per city commentary block (735) depicts sample Fortran 90 code and a functional definition.

Configurational Activity Function A is used to turn off all unhallowed links. This information could be incorporated into the Hamiltonian or into the configurational density matrix. It has been separated for two reasons: 1) it helps keep the penalty function simpler and 2) it will be used to save time computing exponential functions when the Hamiltonian is infinite. A Configurational Activity structure A can be defined either as a function or using a matrix structure. The individual values of the function or elements of the matrix indicate valid and invalid path connections, and may be represented by Boolean, integer, or other values. All elements of the configurational activity A can be initialized with all elements as valid. City one is defined to be on stop one and city N is defined to be on stop N, and all other configurations are eliminated by marking them as invalid. A city can only be on one stop and a stop can only have one city, with all other elements in the configurational be marked as invalid. In one embodiment, configurational activity may be represented in a four dimensional Boolean matrix structure. In an alternative embodiment, A may be a Boolean valued function calculated as called.

Figure 8:
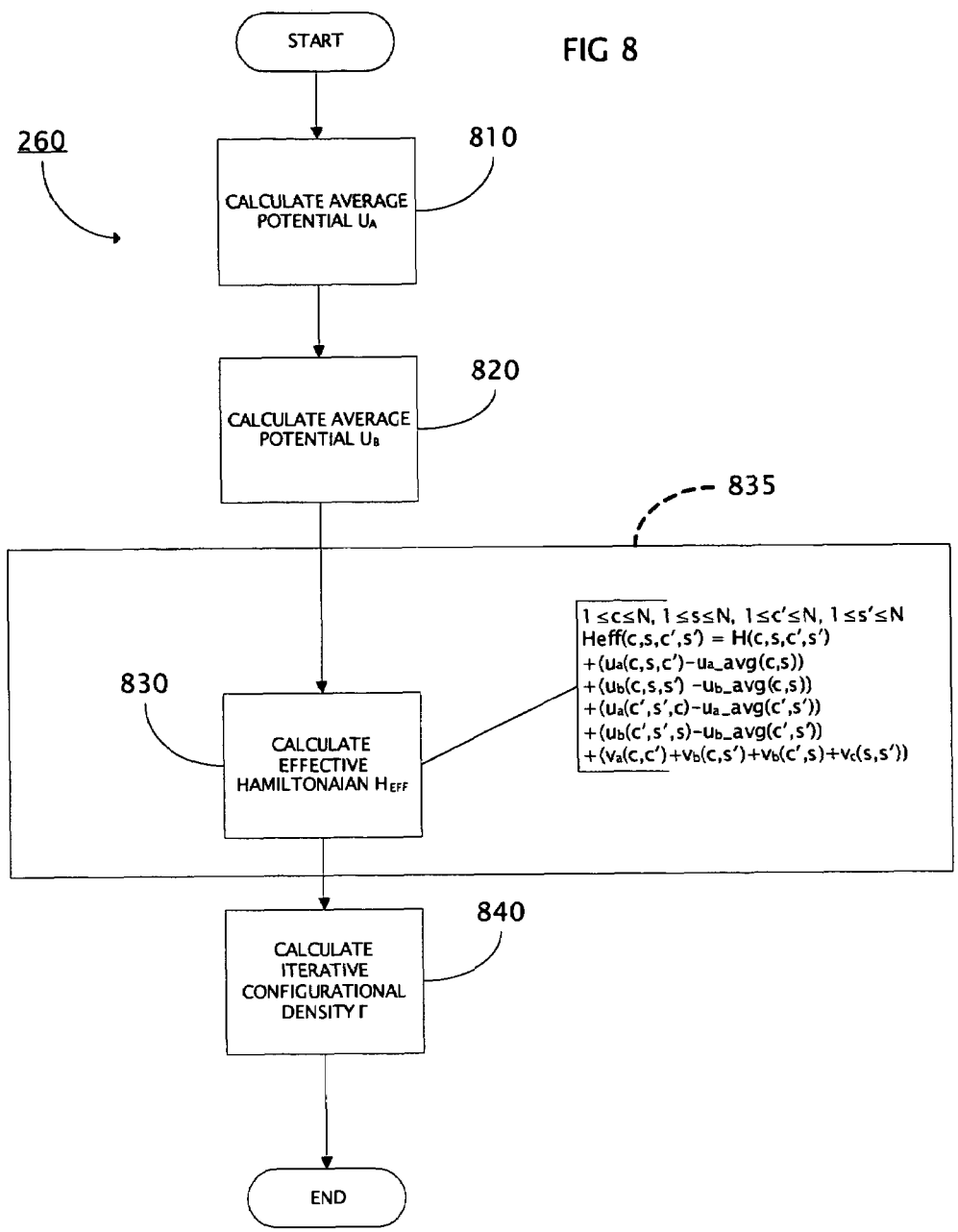
FIG. 8 illustrates the flow of control and process flow in an embodiment of a determine configurational density process.

FIG. 8 illustrates the flow of control in one embodiment of the determine configurational density process (260). Control can pass to the determine configurational density process (260) from a calling process, such as the pre-process process (120) shown in FIG. 1 and FIG. 2. Referring again to FIG. 8, control passes to a calculate average potential ua process (810), which can determine the average potential ua for each city and stop over all cities. Control passes to a over all cities. Control passes to a calculate average potential ub process (820), which determines the average potential ub for each city and stop over all stops. Control passes to a calculate effective Hamiltonian Heff process (830), which computes the effective Hamiltonian by adding to the Hamiltonian the differences between values of ua and the average values of ua, the differences between values of ub and the average values of ub, and values of va, vb, and vc for appropriate cities as depicted in the commentary block (835). Control passes to a Calculate Iterative Configurational Density r process (840), which sets the configurational density r equal to the exponential of the negative of the effective Hamiltonian Heff divided by the temperature T. In one embodiment, the configurational activity matrix A can be included in the computation of the configurational density $\Gamma$ (by multiplying the configurational density times the exponent) in order to simplify downstream calculations. Control can then pass back to the calling process if the configurational density process (260) was called by another process. In another embodiment, the configurational density process (260) may be included in sequence with other portions of the overall process.

Path Distribution

Figure 9:
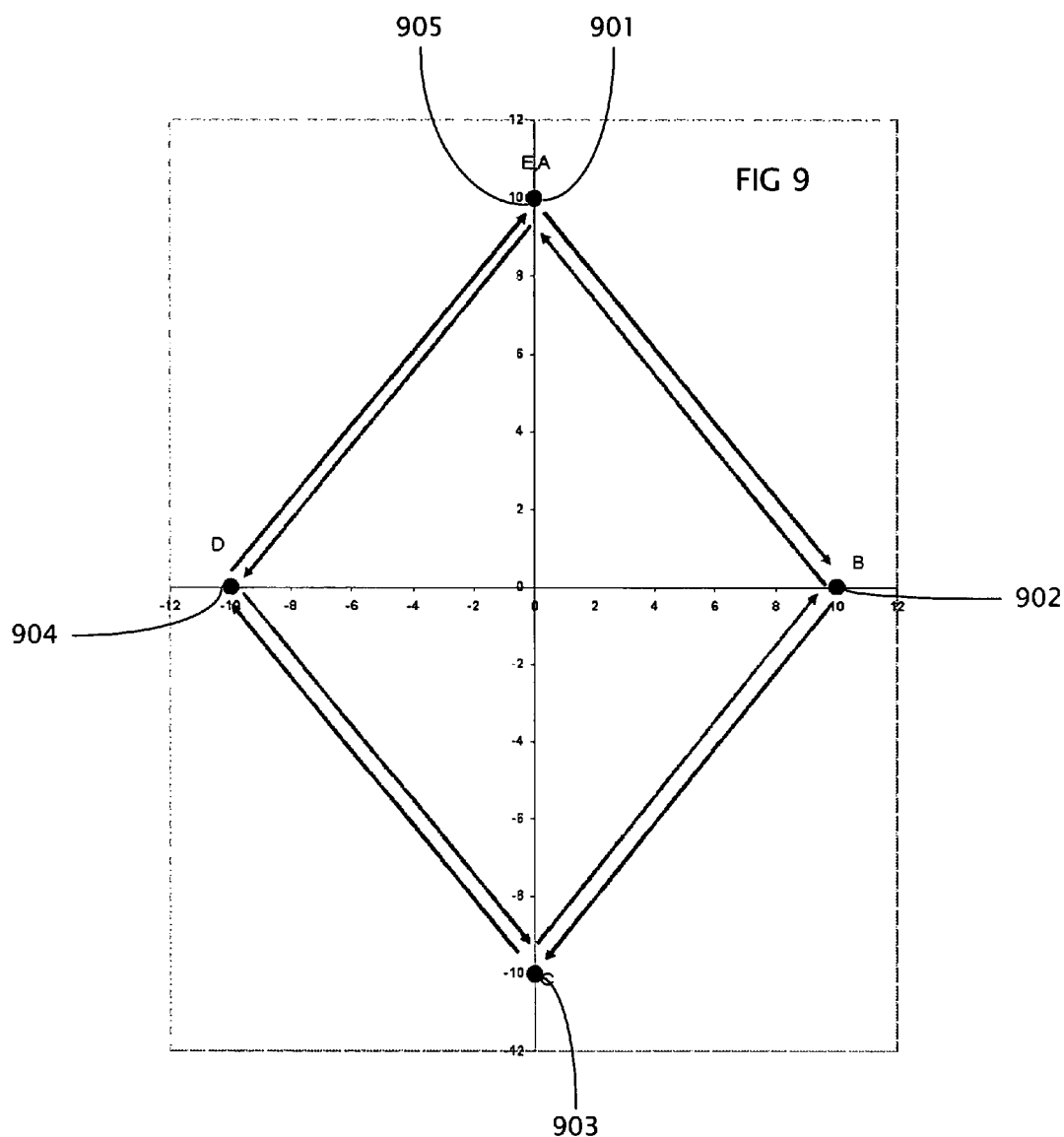
FIG. 9 depicts a map of an explicit example of a traveling salesman problem.

FIG. 9 provides an explicit example of a problem definition. The path distribution in general describes the distribution of optimal paths. A distribution of optimal paths is an abstract concept, described here with an explicit, simplified example illustrated in FIG. 9. The example presents four cities: city A (901), city B (902), city C (903) and city D (904) arranged on the vertices of a diamond. The salesman always starts on city A (901). In order to return him home an additional city E (905) is provided, which lies on the same coordinates as city A (901). The salesman's trip always ends on city E (905).

FIG. 10 shows tables related to the problem depicted in FIG. 9. An all paths table (1001) enumerates and lists all possible paths traversing the cities A, B, C, D, and E. A [p=1 table (1010) and a [p=6 table lists the values of r(c1,s1,c2, s2) for path 1 and path 6, respectively. The clockwise spin table (1030) lists an optimal path, traveling around the circumference clockwise. The counterclockwise spin table (1050) lists an optimal path, traveling around the circumference counterclockwise. The [ table (1040) lists value of [ for different cities and stops. The city-stop density p table (1070) lists city-stop density. The city-city density $\chi$ table (1080) lists city-city density.

For this problem there are only six potential paths, written out in the table shown in FIG. 2. This example has two minimal paths, path 1 and path 5. FIG. 3 depicts all non-zero values of g for path 1, which travels clockwise around the diamond. FIG. 4 depicts all non-zero values of g for path 5, which travels counter-clockwise around the diamond.

A path is described by the path function gp(c,s), where p is the path index, c is the city index, and s is the stop index. The value of g indicates whether or not city c is at stop s following path p. If then is along the path then g=1; if the city is not along the path the g=1. Any valid path must satisfy two constraints: (i) every stop must contain a city and (ii) every city must contain a stop.

The number of paths needed to explore all possible configurations is P=(N-2)!. Since we are working directly with the configurational density function r it is not necessary to know the number of paths. However, it may be helpful to think of the configurational density function F as representing all paths. As the temperature increases without limit (T$\to\infty$) each path is equally probable and the configurational density function F represents all paths. As the temperature is cooled the longer paths am penalized and configurational density is concentrated along shorter paths.

Since the number of paths grows exponentially with the number of cities, an embodiment of the present invention does not attempt to model gp(c, s) explicitly. Instead, it model a distribution that describes gp(c, s) for the shortest paths. There are many ways one might approach such a model. One approach might be to model the average city-stop density, $\rho(c, s)=\Sigma_p g_p(c,s)/P$, where $\rho(c, s)$ is the probability of finding city c on stop s and P is the total number of paths. This distribution is not disfavored, however, because it does not provide enough detail to enforce all the constraints of the problem. It doesn't provide the tools to rule out un-allowed paths. For this reason, there exists a need for a more detailed description.

A distribution which has been found to be sufficient to model the paths is $\lceil(c,s,c',s')=\Sigma pgp(c,s) gp(c',s')/P$. The distribution $\lceil$ describes the probability of finding city c at stop s and finding city c' at stop s'. In FIG. 10, this distribution is developed for path 1 (1010) and for path 5 (1020), then these are combined to form $\lceil$ (1040).

The configurational entropy S is related to the probability of a given configuration in the absence of constraints or penalty functions. The configurational entropy S is determined by considering how many ways there are to create a given distribution, $S=\ln \Omega$. The value of $\Omega$ can be determined as $M!/(\pi c,s,c',s'm(c,s,c',s')!$, where m is then number of paths having a link from city c at stop s and city c' at stop s' and $M=PN2=\Sigma c,s,c',s' m(c,s,c',s')$. By way of example, in order to create a path in c, s, c', s' space one requires N2 links, and in order to create P paths one requires P×N2 links. The value of $\Omega$ then counts the number of unique ways that the links can be configured such that each state has a specific number of links m(s,c,c',s'). Applying Sterling's approximation the configuration entropy associated with the configuration density function can then be expressed as $S=-P \times N2\Sigma c,s,c',s' \lceil(c,s,c',s')\ln(\lceil(c,s,c',s'))$, where $\lceil(c,s,c',s')=m(c,s,c',s')/M$.

Figure 11:
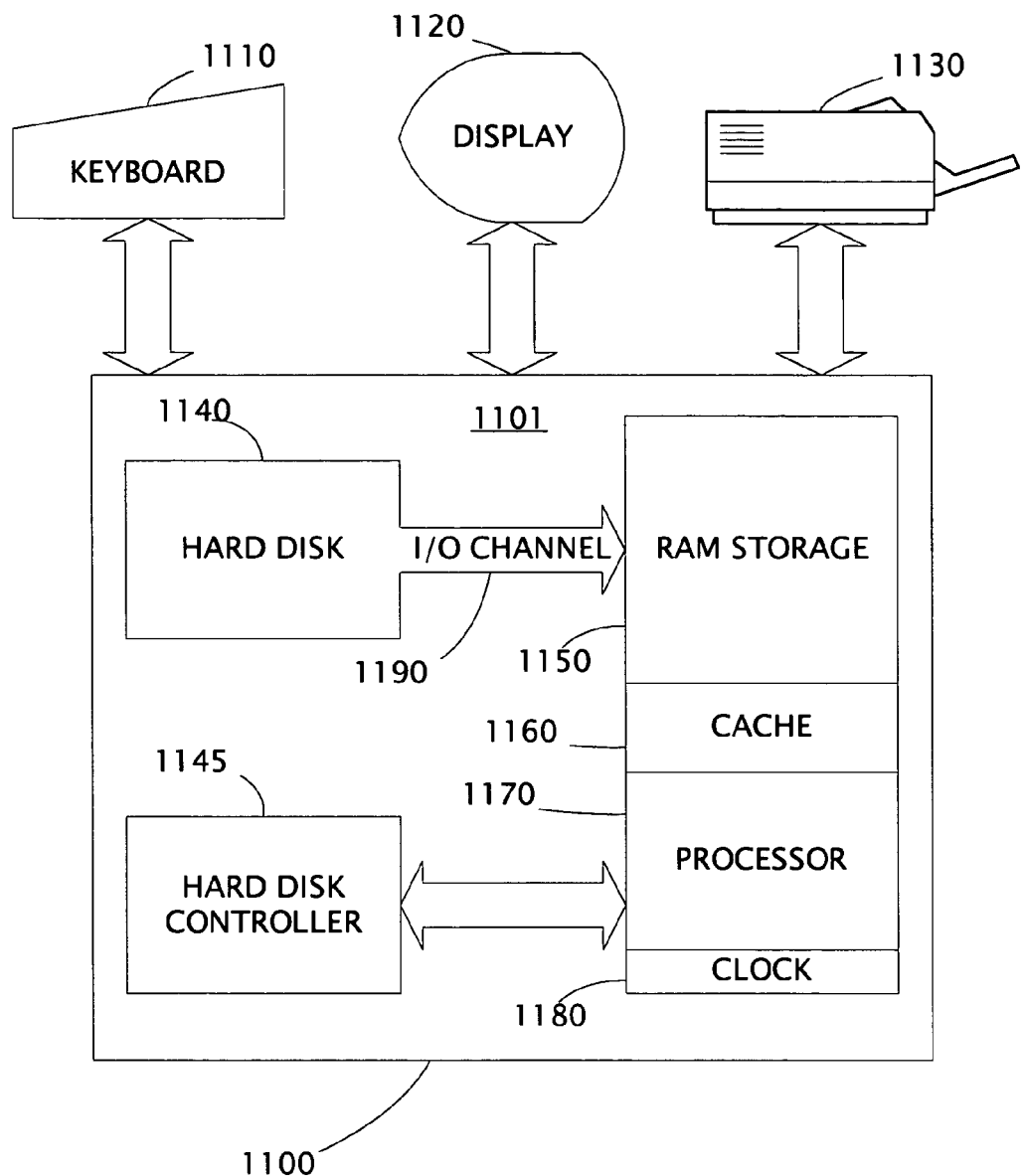
FIG. 11 is a block diagram of one embodiment of hardware suitable for a configurational density processing and system.

Referring now to FIG. 11, there is disclosed a block diagram that generally depicts an example of a configuration of hardware (1100) suitable for a GUI based ground truth tool and user-defined algorithms in data mining. A general-purpose digital computer (1101) includes a hard disk (1140), a hard disk controller (1145), ram storage (1150), an optional cache (1160), a processor (1170), a clock (1180), and various I/O channels (1190). In one embodiment, the hard disk (1040) will store data mining application software, raw data for data mining, and an algorithm knowledge database. Many different types of storage devices may be used and are considered equivalent to the hard disk (1140), including but not limited to a floppy disk, a CD-ROM, a DVD-ROM, an online web site, tape storage, and compact flash storage. In other embodiments not shown, some or all of these units may be stored, accessed, or used off-site, as, for example, by an internet connection. The I/O channels (1190) are communications channels whereby information is transmitted between RAM storage and the storage devices such as the hard disk (1140). The general-purpose digital computer (1101) may also include peripheral devices such as, for example, a keyboard (1110), a display (1120), or a printer (1130) for providing run-time interaction and/or receiving results. Other suitable platforms include networked hardware in a server/client configuration and a web-based application.

While the present invention has been described in the context of particular exemplary data structures, processes, and systems, those of ordinary skill in the art will appreciate that the processes of the present invention are capable of being distributed in the form of a computer readable medium of instructions and a variety of forms and that the present invention applies equally regardless of the particular type of signal bearing computer readable media actually used to carry out the distribution. Computer readable media includes any recording medium in which computer code may be fixed, including but not limited to CD's, DVD's, semiconductor ram, rom, or flash memory, paper tape, punch cards, and any optical, magnetic, or semiconductor recording medium or the like. Examples of computer readable media include recordable-type media such as floppy disc, a hard disk drive, a RAM, and CD-ROMs, DVD-ROMs, an online internet web site, tape storage, and compact flash storage, and transmission-type media such as digital and analog communications links, and any other volatile or non-volatile mass storage system readable by the computer. The computer readable medium includes cooperating or interconnected computer readable media, which exist exclusively on single computer system or are distributed among multiple interconnected computer systems that may be local or remote. Those skilled in the art will also recognize many other configurations of these and similar components which can also comprise computer system, which are considered equivalent and are intended to be encompassed within the scope of the claims herein.

Although embodiments have been shown and described, it is to be understood that various modifications and substitutions, as well as rearrangements of parts and components, can be made by those skilled in the art, without departing from the normal spirit and scope of this invention. Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein. The appended claims are contemplated to cover the present invention any and all modifications, variations, or equivalents that fall within the true spirit and scope of the basic underlying principles disclosed and claimed herein.

I claim:

1. A computer system for solving a traveling salesman problem comprising:

a memory for storing data and instructions to control flow;

a central processing unit for executing instructions and manipulating data stored in the memory;

a traveling salesman problem definition stored in said memory specifying cities as nodes on a graph, said city being able to be visited in a sequence of stops defining a path;

a configurational density component in said memory, said configurational density component producing a value indicating the combined probability of a specified pair of cities and stops;

a configurational activity component stored in said memory, said configurational activity component producing a value indicating whether any allowable path includes a specified pair of cities and stops;

a Hamiltonian component stored in said memory, said Hamiltonian component indicating the cost associated with a path including a specified pair of cities and stops;

a traveling salesman solution space system comprising said configurational density component, configurational activity component, and Hamiltonian component;

a temperature parameter characterizing an entropy associated with said traveling salesman solution space system;

an entropic relaxation process stored in said memory for execution by said central processing unit, said entropic relaxation process comprising iterative reduction of said temperature parameter, said reduction of said temperature parameter iteratively reducing said entropy, recalculation of said traveling salesman solution space system based on said reduction of said temperature parameter, said entropic relaxation process producing a state of lower energy defining a set of preferred paths.

2. A computer readable medium containing a data structure for storing information relating to a solution to traveling salesman problem, said traveling salesman problem being characterized by a list of cities and costs associated with paths traversing said cities, the data structure comprising:

a configurational density table, said configurational density table being characterized by a first CD city index, a first CD stop index, a second CD city index, and a second CD stop index, the configurational density table containing a configurational density value for each said first CD city index, first CD stop index, second CD city index, and second CD stop index ordered quadruple, said configurational density value corresponding to the probability of having a first city corresponding to said first CD city index at a stop corresponding to said first CD stop index and a second city corresponding to said second CD city index at said CD second stop;

a configurational activity table, said configurational activity table being characterized by a first CA city index, a first CA stop index, a second CA city index, and a second CA stop index, the configurational activity table containing an configurational activity value for each said first CA city index, first CA stop index, second CA city index, and second CA stop index ordered quadruple, said configurational activity value corresponding to whether there exists an allowable path having a first city indicated by said first CA city index at a stop indicated by said first CA top index and a second city indicated by said second CA city index at stop indicated by said second CA stop index;

a Hamiltonian table, said Hamiltonian table being characterized by a first HM city index, a first HM stop index, a second HM city index, and a second HM stop index, the Hamiltonian table containing a cost value for each said first HM city index, first HM stop index, second HM city index, and second HM stop index ordered quadruple, said cost value corresponding to the cost associated with having a first city indicated by said first HM city index at a stop indicated by said first HM stop index and a second city indicated by said second HM city index at stop indicated by said HM second stop index.

3. The data structure according to claim 2, wherein said configurational activity table and said configurational density are combined in one table.

4. The data structure according to claim 2, wherein said configurational activity table and said Hamiltonian table are combined in one table.

5. The data structure according to claim 2, further comprising a city-city density table, said city-city density table being characterized by a first CC city index and a second CC city index, the city-city density table containing a city-city density value for each said first CC city index and second CC city index pair, said city-city density value corresponding to the probability across all paths if traveling from a city corresponding to said first CC city index to a city corresponding to said second CC city index.

6. The data structure according to claim 2, further comprising a city-stop density table, said city-stop density table being characterized by a CS city index and a CS stop index, the city-stop density table containing a city-stop density value for each said CS city index and CS stop index pair, said city-city density value corresponding to the probability across all paths of finding a city corresponding to the CS city index at a stop corresponding the CS stop index.

7. A computer program product including a medium containing computer program code for controlling execution of instructions, flow of control, and transformation of data in a computer system, comprising:

computer program code defining a configurational density function, said configurational density function being characterized by a first CD city parameter, a first CD stop parameter, a second CD city parameter, and a second CD stop parameter, the configurational density function producing a configurational density value for each said first CD city parameter, first CD stop parameter, second CD city parameter, and second CD stop parameter, said configurational density value corresponding to the probability of having a first city corresponding to said first CD city parameter at a stop corresponding to said first CD stop parameter and a second city corresponding to said second CD city parameter at said CD second parameter;

computer program code defining a configurational activity function, said configurational activity function being characterized by a first CA city parameter, a first CA stop parameter, a second CA city parameter, and a second CA stop parameter, the configurational activity function producing a configurational activity value for each said first CA city parameter, first CA stop parameter, second CA city parameter, and second CA stop parameter, said configurational activity value corresponding to the probability of having a first city corresponding to said first CA city parameter at a stop corresponding to said first CA stop parameter and a second city corresponding to said second CA city parameter at said CA second parameter;

computer program code defining a Hamiltonian function, said Hamiltonian function being characterized by a first HM city parameter, a first HM stop parameter, a second HM city parameter, and a second HM stop parameter, the Hamiltonian function producing a Hamiltonian value for each said first HM city parameter, first HM stop parameter, second HM city parameter, and second HM stop parameter, said Hamiltonian value corresponding to the probability of having a first city corresponding to said first HM city parameter at a stop corresponding to said first HM stop parameter and a second city corresponding to said second HM city parameter at said HM second parameter.

8. The computer program product according to claim 7, wherein said configurational activity function and said configurational density function are combined in one function.

9. The computer program product according to claim 7, wherein said configurational activity function and said Hamiltonian function are combined in one function.

10. The computer program product according to claim 7, further comprising a city-city density function, said city-city density function being characterized by a first CC city parameter and a second CC city parameter, the city-city density function containing a city-city density value for each said first CC city index and second CC city parameter pair, said city-city density value corresponding to the probability across all paths if traveling from a city corresponding to said first CC city parameter to a city corresponding to said second CC city parameter.

11. The computer program product according to claim 7, further comprising a city-stop density function, said city-stop density function being characterized by a CS city index and a CS stop index, the city-stop density function containing a city-stop density value for each said CS city parameter and CS stop parameter pair, said city-city density value corresponding to the probability across all paths of finding a city corresponding to the CS city index at a stop corresponding the CS stop parameter.

* * * * *